United States Patent [19]

Jeskey et al.

[11] Patent Number: 5,496,384
[45] Date of Patent: Mar. 5, 1996

[54] ARTIFICIAL FIREPLACE LOG

[76] Inventors: Brian E. Jeskey, 521 Fernleaf, Corona Del Mar, Calif. 92625; Matthew C. Sandt, 1196 N. Viceroy Ave., Covina, Calif. 91722; Martin A. Supple, 11865 Ashworth St., Artesia, Calif. 90701

[21] Appl. No.: 248,193

[22] Filed: May 24, 1994

[51] Int. Cl.$^6$ .................................. C10L 5/48; C10L 5/00
[52] U.S. Cl. .................................. 44/535; 44/532
[58] Field of Search .................................. 44/535

[56] References Cited

U.S. PATENT DOCUMENTS 4,120,666  10/1978  Lange ........................... 44/535
4,818,249   4/1989  Barrett, Jr. ..................... 44/535
5,066,311  11/1991  Chalmer ......................... 44/535

Primary Examiner—Ellen M. McAvoy
Attorney, Agent, or Firm—Francis X. LoJacono

[57] ABSTRACT

An improved artificial fireplace log wherein the primary ingredient consists of paper waste sludge material that is recovered from settling ponds or clarifiers as waste material which is created during the manufacture of virgin or recycled paper. This waste sludge material is mixed with a suitable wax and is pressed into a fireplace log having a plurality of longitudinally arranged bores that define passages for air to flow from one end to the other.

20 Claims, 1 Drawing Sheet

ARTIFICIAL FIREPLACE LOG

BACKGROUND OF THE INVENTION

1. Field of the Invention

The present invention relates to an artificial fireplace log, and more particularly to an improved artificial fireplace log, wherein the primary ingredient consists of paper waste sludge material that is recovered from settling ponds or clarifiers as waste material created during the manufacture of virgin or recycled paper.

The most conventional artificial or synthetic fireplace logs more commonly contain up to 65% by weight of oil refinery slack wax added to and mixed with wood particles and extruded into an imitation log having a predetermined configuration. However, it is well known in the art that many of the present artificial fireplace logs have various problems and difficulties that are encountered in the manufacture thereof or during the burning of the log. There have been several attempts to make fireplace logs from a slurry of water and paper pulp which dries hard and firm. The making of fuel from waste paper, particularly newsprint, has not been successful because of the difficulty in forming a product of integrity and good burning characteristics at a reasonable price. That is, some logs burn in an inconsistent manner while others are provided with chemical components that are not safe and prevent them from being moved or rearranged during their burning cycle. Many require warnings that recommend that the log not be moved or repositioned once it has been lit. This is generally due to the mixture of very volatile compounds that are used in the various complicated processes for the manufacturing of known artificial fireplace logs.

The following are examples of the various types of fireplace logs having different configurations as well as varying compounds to establish their individual uniqueness.

In U.S. Pat. No. 2,170,326 to O. Headland, there is disclosed a fuel device for starting fires for cooking or for heating purposes, but does not define a fireplace log.

In U.S. Pat. No. 3,744,980 to F. B. Harris, there is disclosed a method for making artificial fuel from ground paper which is placed in a basket-type porous container.

In U.S. Pat. No. 3,843,336 to H. C. Messman, there is disclosed an artificial fireplace log and a continuous, hot extrusion process for making a highly filled, porous resin log. The log includes an extruded, thermoset resin skeleton filled with particulate vegetable matter.

In U.S. Pat. No. 4,043,765 to D. J. Tanner, there is disclosed artificial fireplace logs that are provided with an ignition strip of readily flammable material which is applied along the outside of the log, preferably in a groove.

In U.S. Pat. No. 4,062,655 to W. H. Brockbank, there is disclosed artificial fireplace logs which burn with colored flame and the process for making same, wherein the log contains a pyrogenic coloring matter which produces colored flames upon ignition of the log and continuously until the log is consumed.

In U.S. Pat. No. 4,120,666 to S. R. Lange, there is defined a synthetic fireplace log having a hollow core, the log being composed of shredded paper and wax.

In U.S. Pat. No. 4,147,518 to K. L. DeHart et al, there is disclosed a fire kindling device, extrusion method for making a kindling device having a composition of wood particles or chips of predetermined size and flammable paraffin wax in a ratio of about two parts wax to one part wood by weight.

In U.S. Pat. No. 4,243,394 to T. R. Kincaid, there is disclosed a pie-segment-shaped flammable artificial firelog.

In U.S. Pat. No. 4,326,864 to J. D. Tanner, there is disclosed a synthetic firelog that is made without wax, or with a reduced wax content.

One may also refer to U.S. Pat. No. 4,810,255 to J. E. Fay et al entitled "Manufactured Fuel Article".

SUMMARY OF THE INVENTION

The principle object of the present invention is to provide an improved artificial fireplace log which is simple and easy to manufacture from sludge material that is commonly a waste product which results from the manufacturing of paper products.

As is well known in the art of manufacturing paper, a basic wood fiber is used and comes from wood chips which are a by-product of the harvesting of trees. The wood chips are processed by cooking them to remove lignin, the "glue" that holds the wood fiber together. After separating the wood fibers, they are processed to meet the specific requirements of the paper products they are to become. As an example, wood fibers which are to be used in fine writing grades of paper are bleached so that, when formed into sheets, they will have a bright white appearance. Any type of fiber from trees (or plants) which has not yet been used in the manufacture of a final product is referred to as "virgin" fiber, which provides a large share of the fiber resource that goes into paper production.

Another source of fiber for paper manufacturing comes from a recycled fiber facility, wherein waste paper which has been collected from various sources is reprocessed whereby the fiber is cleaned so that is can be used again in another paper making process. This recycled fiber facility is typically referred to as a "deink" plant for paper used in writing grades. Other paper types such as tissue or cardboard are gathered and recycled in a similar process.

Both virgin fiber mills and recycle plants prepare fiber for market use, mostly for paper production. Dirt and other contaminants are separated from the good fiber in various types of cleaning equipment. Some fiber joins with the dirt and other rejected materials in the waste stream and settles in a clarifier or settling pond where it becomes unusable waste sludge.

In a paper manufacturing plant, similar fiber cleaning equipment is used to insure clean sheets of paper. The paper making process can be described in simple terms as slushing the fiber by mixing it with water, cleaning it, spreading it onto a large moving screen where much of the water drains from the fiber, pressing, and finally drying the sheet.

Some fiber is always lost in the cleaning stage. While some of the rejected fiber may be reclaimed, a proportion will be "sewered", sending the waste to a water treatment area such as a settling pond or clarifier.

Also in the paper manufacturing, additives other than fiber are typically used to aid in the manufacturing process or to affect the sheet characteristics of the final product. For instance, ash and clay are commonly added to give the finished sheet improved smoothness and for writing or printing. A caustic chemical or alum are often used to control the acidity of the fiber slurry in the process. During production upsets, batches of prepared fiber, ash, clay, etc., are often sewered and a fresh batch prepared. Again, the sewered materials flow to a settling pond or clarifier for treatment in which much of the solids are removed from the water. Typically, the sludge solids are sent to a landfill.

Mill sludge from virgin or recycled paper manufacturing contains a sufficient proportion of wood fiber that can be dried and mixed with wax so as to produce a combustible material capable of being formed in various shapes including those suitable for use as fireplace logs.

Additives may be used in the manufacture of fireplace logs to enhance the aesthetics of the flames produced by the fire. That is, scents are added to provide pleasant odors and various chemicals are added to alter the color of the flames.

Accordingly, an important object of the present invention is to manufacture fireplace logs that use principally waste paper mill sludge accumulated from the processing and manufacturing of virgin paper and/or recycled paper.

Another object of the present invention is to provide a fireplace log that uses paper manufacturing sludge by retrieving the sludge from a settling pond or clarifier and then removing the water content by at least fifty percent (50%) so as to form a cake-like material which feels moist to the touch, after which the cake material is shredded into fibrous pellets having cross-sectional dimensions of not more than ⅜". This shredded sludge is then dried to a moisture consistency of between forty percent (40%) and ten percent (10%) by weight.

Still another object of the invention is to provide a fireplace log wherein the sludge pellets are shredded and mixed with a given proportion of suitable wax.

A further object of the present invention is to provide a fireplace log wherein the shredded sludge material of the log is between forty percent (40%) and sixty percent (60%) in weight, and would include a wax content of between forty percent (40%) and sixty percent (60%).

Still a further object of the invention is to provide a fireplace log of this character wherein at least one longitudinal bore is formed in the log so as to be angularly disposed with respect to the longitudinal axis of the log, the bore extending throughout its length, whereby a passage is defined for oxygen to reach the inner portions of the fireplace log by entering the lower open end of the bore and exiting the upper open end of the bore.

Yet another object of the present invention is to provide an improved fireplace log that includes a plurality of angularly disposed longitudinal bores that are positioned adjacent the parallel walls of the log, wherein the maximum space between the outer surface of the walls and the bores is approximately 1.5".

The characteristics and advantages of the invention are further sufficiently referred to in connection with the accompanying drawings, which represent one or more embodiments. After considering these examples, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Novel features and advantages of the present invention in addition to those mentioned above will become apparent to those skilled in the art from reading the following detailed description in conjunction with the accompanying drawings wherein.

DESCRIPTION OF THE PREFERRED EMBODIMENT

Figure 1:
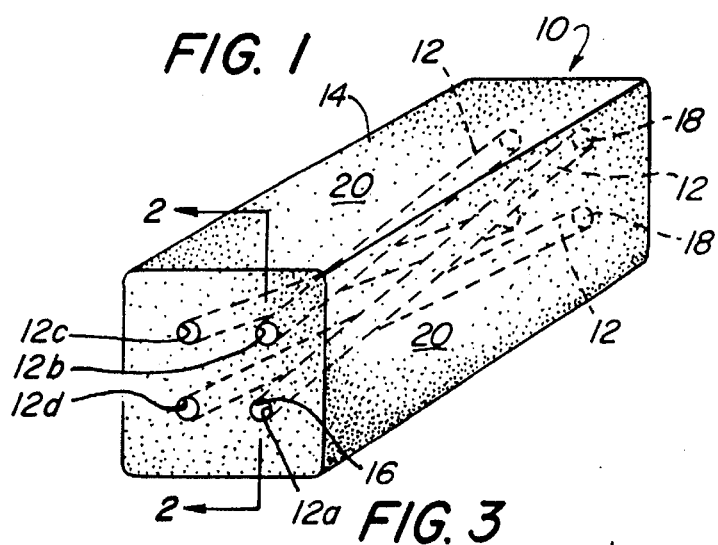
FIG. 1 is an isometric view of a fireplace log having a plurality of angularly disposed bores formed in the composite log structure.
Figure 2:
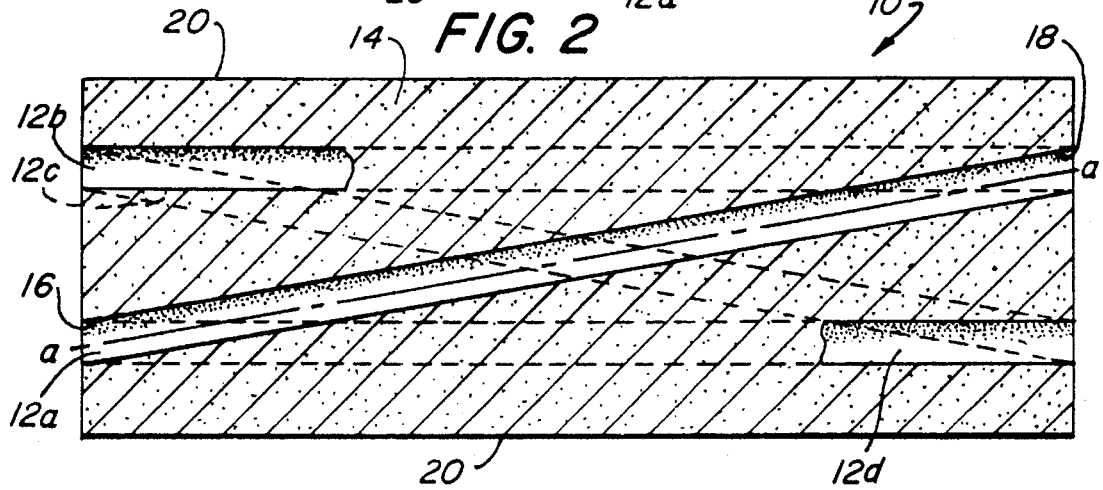
FIG. 2 is an enlarged, longitudinal, cross-sectional view taken substantially along line 2—2 of FIG. 1 showing one of the angularly disposed bores therein.

The preferred configuration of an artificial fireplace log 10 of the present invention is illustrated in FIGS. 1 and 2, wherein an elongated rectangular block of the finished product is formed having a suitable thickness and length to accommodate its use in a typical fireplace. Thus, the composite log structure may be formed having a length between 10 to 16 inches with the thickness thereof being between 3 to 4 inches. That is, fireplace log 10 should be formed having four equal sides of between 3 to 4 inches in width.

An additional improvement in the combustion of the synthetic fireplace log has resulted from the recognition of the difficulty in providing oxygen for combustion to areas within a solid core log. It has been previously recognized that coking occurs when the thickness of the log does not allow the presence of oxygen to complete the combustion. It was this recognition that prompted others to provide central bores through the center of fireplace logs. Doing so provides additional oxygen to the interior of the body of a log, thereby aiding to a degree the complete combustion of the composite materials that make up the fireplace log.

While a single central horizontal bore does provide a path for oxygen to be able to reach the inner portions of the core of the log, it does not permit a free flow of fresh air throughout the full length of a horizontal bore of a log. To overcome this problem the present invention includes elongated bores 12 that provide angularly disposed air passages within body 14 of the composite log structure 10. The preferred number of bores is defined by four air passages, as shown in the drawings. Four bores 12a through 12d are positioned within the core of body 14 so as to be skewed therein, as illustrated in FIGS. 1 and 2 and indicated by axis a—a in FIG. 2. Although four bores are shown, the number of bores required will depend on the cross-sectional dimensions of the fireplace log.

Figure 3:
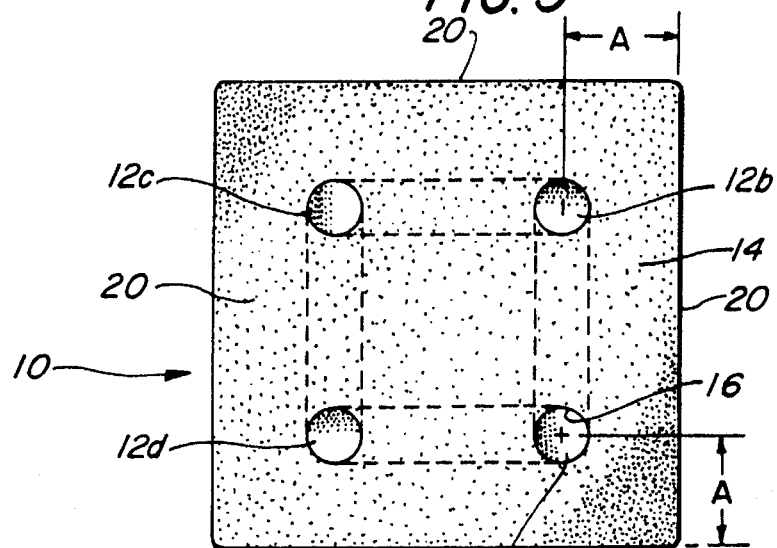
FIG. 3 is an enlarged end view of the fireplace log showing the position of the bores with respect to each parallel outer surface of the log.

While each bore or air passage extends longitudinally through the length of the fireplace log, they are each angularly disposed to the longitudinal axis b—b of log 10. Accordingly, the opposite open ends 16 and 18 of the angular positioned bore 12a, as seen in FIG. 2, are arranged to have different elevations, whereby a draft is created through the passage during combustion, so that fresh oxygen is drawn throughout the full length of the bore passage. During various experiments it has been found that the positioning of the bores should be between 1" and 1.5" from the outer surfaces 20 of the log 10, indicated at "A" in FIG. 3. This arrangement of ventilating bores in synthetic fireplace logs can be applied to a variety of shapes and cross-sectional dimensions.

The process of the present invention is practiced by formulating an artificial log mix containing combustible materials which include sludge waste material and a suitable wax as its base structure. The waste sludge used herein is taken from settling ponds or clarifiers found associated with virgin or recycled paper manufacturing, wherein the sludge contains a sufficient proportion of wood fiber along with other waste elements such as clay and ash. Until now such sludge material has been found unsuitable.

Sludge from a settling pond or clarifier is removed and either pressed to remove water, or spread to be air-dried. Most press equipment cannot remove more than approximately 50 percent of the water contained therein. This leaves a cake-like material which feels moist to the touch. A process of the present invention includes the step of shredding the cake sludge into fibrous pellets, each having a cross-sectional dimension of not more than ⅜". This shredded sludge is then dried to a moisture consistency of between 10 percent and 40 percent by weight. However, the preferred moisture content is closer to 20 percent, as indicated in the Examples as hereinafter disclosed.

The shredded and dried sludge is mixed in proportions with any one of many suitable wax products. The sludge content of the proposed fireplace log may range from 40 to 60 percent by weight. The wax content of the fireplace log can range between 40 to 60 percent in weight. This wax is liquefied and added to the dried shredded sludge material which are then mixed to comprise a uniform consistency. The mixture is allowed to cool so that the wax can regain its solid state. The mixed sludge and wax is then transferred to a press in which a fireplace log is shaped into a selectively characteristic configuration. When this is completed the log is ejected from the press and is sealed in a flammable wrapper and boxed for shipping.

It should also be noted that a soft wax referred to as unrefined or slack wax can be feasibly mixed through mechanical means at room temperature (not melted) with the dried shredded sludge.

EXAMPLE I

Room temperature: 70 deg. F.

Wax temperature: 144 deg. F.

Sludge moisture: Approx. 20%

Target sludge/wax ratio: 50/50

Target log description: 5 lbs with ventilation holes
Procedure:

Mixed 1¾ lbs. dried and shredded sludge material and 1¾ lbs. unrefined wax to provide 3½ lbs. of mixed material. Loaded and pressed mix into mold (with rods inserted into mold so as to be angularly disposed to the longitudinal axis of the log being formed). Repeated mix procedure with another 3½ lbs. of mixed material. Loaded and pressed material into mold. Withdrew rods and ejected the log from mold.

The molded log was suitably firm. Total formed weight was 6 lbs 7½ oz. Calculated and chopped off log from original length of 13' to 10½". New final weight was 5 lbs. 4 oz.

Burn Test:

The log was placed on andirons and lit at the lower corner of one end. Almost no wax dripped. Fire was very attractive. No wax odor was noticed. Lighting took 2 matches.

After 1 hour: log was completely engulfed in flame.

After 2 hours: log was still burning nicely with a uniform flame centered on the log.

After 2 hours and 50 minutes: flame was almost out.

Hours later, the log had completely collapsed, although there was a small amount of combustion still active in the residue.

EXAMPLE II

Room temperature: 70 deg. F.

Wax temperature: 144 deg. F.

Sludge moisture: Approx. 20%

Target sludge/wax ratio: 50/50

Target log description: 5 lbs with ventilation holes
Procedure:

Mixed 1¾ lbs. dried and shredded sludge material and 1¾ lbs. unrefined wax to provide 3½ lbs. of mixed material. Loaded and pressed mix into mold (with rods inserted into mold so as to be angularly disposed to the longitudinal axis of the log being formed). Repeated mix procedure with another 3½ lbs. of mixed material. Loaded and pressed material into mold. Withdrew rods and ejected the log from mold.

This action of pressing out the log partially collapsed holes near the end where force was applied. Holes were partially cleared for purposes of combustion test. Appearance of log was good. Log was firm but was still soft and easily deformable. Total formed weight was 6 lbs. 7½ oz. Calculated and chopped off log from original length of 13" to 10½". New final weight was 5 lbs. 4 oz.

Burn Test:

The log was placed on andirons and lit at the lower corner of one end. Almost no waxed dripped. Fire was very attractive. No wax odor was noticed. Lighting took 3–4 matches.

After 1½ hours: about ⅔ of log was engulfed in flame.

After 3 hours: about ½ of log had small blue residual flames while most of the rest was engulfed in yellow flame.

Several hours later the residual was as observed. The log had completely collapsed through the andirons into an aluminum foil below. A small amount of combustion was still active in this material. The residual ash weight was 12 oz. which is 15% of the original log weight.

The foregoing should only be considered as illustrative of the principles of the invention. Further, since numerous modifications and changes may readily occur to those skilled in the art, it is not desired to limit the invention to the exact construction and operation as shown and described, and accordingly, all suitable modifications and equivalents may be resorted to, falling within the scope of the claimed invention.

What we claim is:

1. In combination an artificial fireplace log, the improvement comprising an elongated combustible body defined by a solid core and formed from a substantial quantity of waste sludge material taken from a paper mill sludge pond or clarifier and a substantial quantity of wax mixed with said paper waste sludge material so as to act as a fuel and a binder, wherein at least one longitudinal bore having an upper and lower open end is positioned within said solid core of said combustible body, said longitudinal bore defining an air passage angularly disposed to the longitudinal axis of said combustible body.

2. The combination as recited in claim 1, wherein a plurality of longitudinal bores are angularly disposed in said combustible body and wherein each of said longitudinal bores is skewed with respect to each other.

3. The combination as recited in claim 2, wherein said longitudinal bores are selectively positioned within said core of said combustible body so as to be inwardly spaced from the outer surface thereof at a distance determined by the cross-sectional configuration of said combustible body.

4. The combination as recited in claim 3, wherein said paper waste sludge material is dried to form shredded pellets which are mixed with said wax, wherein the proportions of said waste sludge material and wax range between 40 and 60 percent by weight.

5. The combination as recited in claim 4, wherein said waste sludge material has a moisture content of between 10 and 30 percent, and wherein said waste sludge material and said wax have a 50/50 ratio by weight.

6. The combination as recited in claim 5, wherein said combustible body is formed in a rectangular configuration with a length of between 10 to 16 inches and a thickness of between 3 to 4 inches.

7. The combination as recited in claim 6, wherein said outer surface of said combustible body is formed having four equal sides, wherein each of said bores is positioned in a parallel plane with each respective wall thereof.

8. The combination as recited in claim 7, wherein the spaces between said bores and said respective walls thereof are between 1" and 1.5".

9. The combination as recited in claim 8, wherein said paper waste sludge material is dried to a moisture consistency of between forty percent and ten percent by weight.

10. The combination as recited in claim 5, wherein said paper waste sludge material is dried to a moisture consistency of twenty percent by weight.

11. The combination as recited in claim 10, wherein said combustible body is formed in a rectangular configuration defined by four side walls and oppositely disposed end walls, and wherein four elongated bores defining air flow passages are positioned adjacent to and parallel with said side walls, each of said bores being skewed with respect to its adjacent bore.

12. An artificial fireplace log comprising an elongated combustible body defined by a solid core consisting of a substantial quantity of waste sludge material taken from a paper mill sludge pond or clarifier and including a substantial quantity of wax mixed with said paper waste sludge material so as to act as a fuel and a binder.

13. An artificial fireplace log as recited in claim 12, wherein said waste sludge material has a moisture content between 10 and 30 percent which is mixed with said wax, wherein the proportions of said waste sludge material and wax range between 40 and 60 percent by weight.

14. An artificial fireplace log as recited in claim 12, wherein said waste sludge material has a moisture content of between 18 and 25 percent, which is mixed with said wax, wherein the proportions of said waste sludge material and wax range between 40 and 60 percent by weight.

15. An artificial fireplace log as recited in claim 12, wherein said waste sludge material has a moisture content of 20 percent which is mixed with said wax, wherein the ratio of said waste sludge material to said wax is 50/50 by weight.

16. An artificial fireplace log as recited in claim 15, wherein said solid core of said combustible body is formed having at least one longitudinal bore defining an air passage disposed parallel to the longitudinal axis of said combustible body.

17. An artificial fireplace log as recited in claim 15, wherein said solid core of said combustible body is formed having a plurality of longitudinal bores defining air passages disposed parallel to the longitudinal axis of said combustible body.

18. An artificial fireplace log as recited in claim 15, wherein said combustible body is formed having a rectangular configuration with four equal side walls, wherein four elongated bores are positioned in said core in a parallel plane with each respective side wall and spaced inwardly therefrom.

19. An artificial fireplace log as recited in claim 18, wherein said bores are spaced inwardly of said side walls from 1" to 1.5".

20. An artificial fireplace log, wherein the primary ingredient is waste material created during the manufacture of virgin or recycled paper and taken from a mill sludge pond or clarifier, and wherein said artificial fireplace log comprises an elongated combustible body defined by a solid core consisting of a substantial quantity of paper waste sludge material and a substantial quantity of wax mixed with said paper waste sludge material so as to act as a fuel and a binder.

\* \* \* \* \*